June 21, 1960  A. E. WORTHINGTON  2,942,111
CONTOURED LOGGING SONDE
Filed June 28, 1955
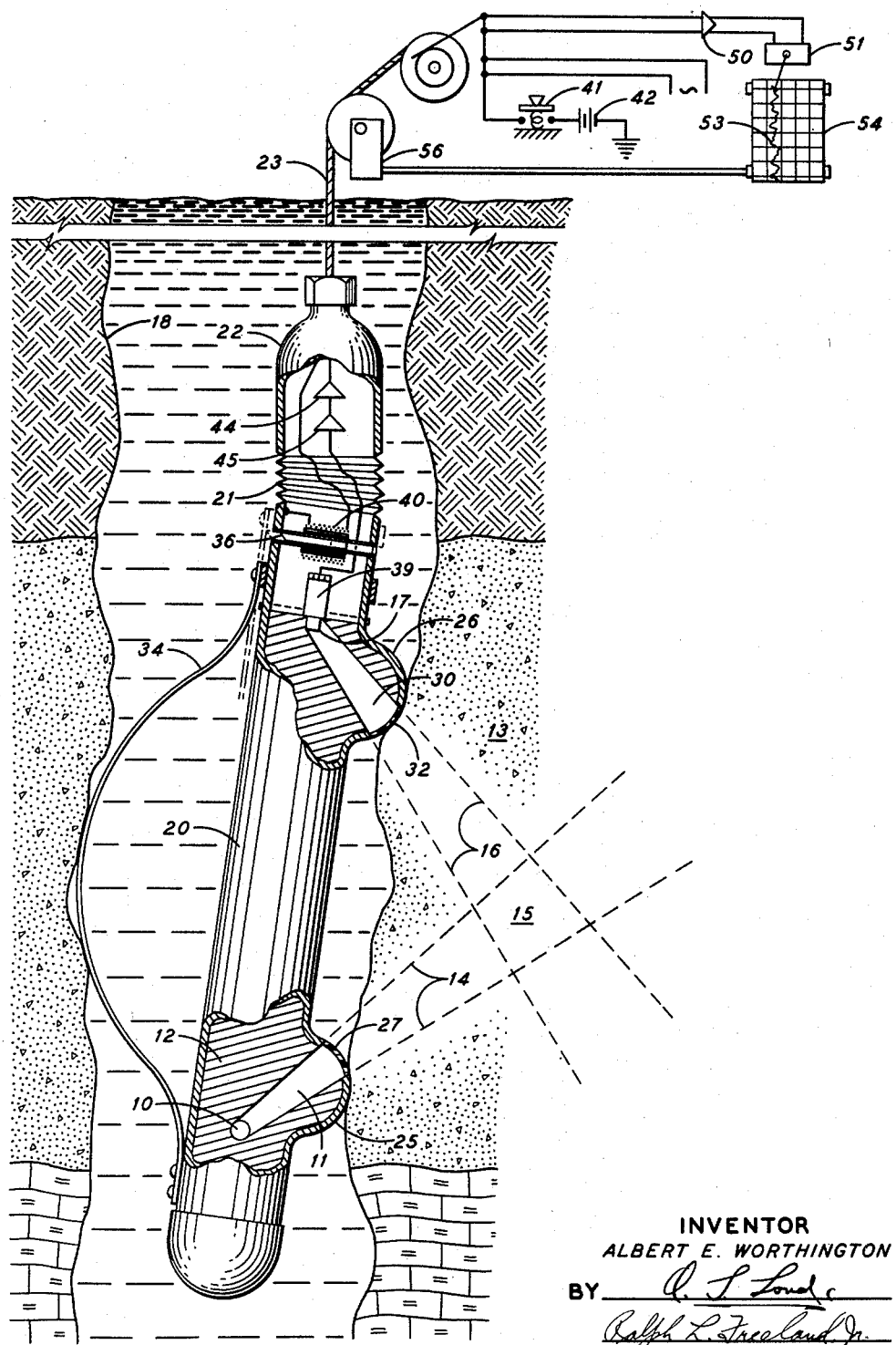
INVENTOR
ALBERT E. WORTHINGTON
BY
ATTORNEYS

United States Patent Office 2,942,111
Patented June 21, 1960

2,942,111

CONTOURED LOGGING SONDE

Albert E. Worthington, Fullerton, Calif., assignor to California Research Corporation, San Francisco, Calif., a corporation of Delaware Filed June 28, 1955, Ser. No. 518,445

1 Claim. (Cl. 250—83.3)

The present invention relates to apparatus for well logging, more particularly to logging sondes adapted to bring signal generating and signal detecting systems into contact with the bore hole walls. The invention has for an object the provision of an improved form of logging apparatus useful for investigating bulk density of earth formations wherein a gamma radiation source and a gamma ray detector may be continuously maintained in measuring contact with the walls of an irregular bore hole to permit the gamma ray absorption and back-scattering measurements indicative of bulk density of said formations to exclude to a high degree the volume of drilling fluid contained in irregularities of the bore hole wall, which fluid normally degrades the quality of the density measurements when fluid filled irregularities form part of the gamma ray path between source and detector.

In the logging of formations traversed by a well bore, it has long been recognized that irregularities in the diameter and the shape of the well bore affect the physical measurements being made therein. Accordingly, it is frequently necessary to make a caliper survey of the diameter of the well bore in order to provide a correct interpretation of the physical measurement along any particular portion of the bore hole.

In the logging of bulk density by the irradiation of an earth formation with a gamma ray source and simultaneous measurement of the intensity of back-scattered gamma radiation, it has been found that the recorded measurement is greatly affected by the total amount of drilling fluid interposed in the gamma ray path between the source and the detector; namely, the fluid between the source opening in the sonde and the actual earth formation whose density is being measured, and the fluid between the detector opening in the sonde and said actual earth formation, both adversely affect the measured value of the density.

In accordance with a preferred form of apparatus for carrying out the present invention the inclusion of the drilling fluid, in those portions of a bore hole having either irregular shapes or dimensions, is to a great extent alleviated by the provision of a logging sonde having a body member supported from the lower end of a well logging cable with said body member having a pair of laterally extending protuberances, associated respectively with a source of gamma radiation and a detector for gamma rays, that are vertically spaced a predetermined distance apart. The body member may be urged into engagement with the bore hole walls by bow springs or the like so that said protuberances will continuously contact the side wall in order to include a predeterminable volume of the earth's strata in the path of the gamma rays while excluding drilling fluid and filter cake normally present in irregularities of the side walls.

In said preferred form of apparatus the gamma radiation source and detector are positioned a predetermined, vertical distance apart with radiation shielding means interposed therebetween. The body portion may be flexibly supported below a head section which may contain the electronic circuitry normally associated with such a device.

Further objects and advantages of the present invention will become apparent from the following detailed description taken in conjunction with the accompanying drawing, which forms an integral part of the present specification.

In the drawing:

The single figure is a schematic representation, partially in section, of a preferred form of apparatus for carrying out the present invention, as applied to a bulk density logging system.

Referring now to the drawing and in particular to the figure, the present invention has been illustrated as being applied to a system of bulk density logging wherein a gamma radiation source 10 and a radiation detector 17 are positioned a predetermined distance apart to measure the number of back-scattered gamma rays scattered by an earth formation lying along a well bore.

The general method of gamma ray logging to measure bulk density, to which the present invention is applied, is particularly described in the copending application of Jones, Baker, and Fleming, application Serial No. 349,491, filed April 17, 1953, which application is assigned to the assignee of the present invention. As therein described, gamma radiation source 10 desirably emits substantially mono-energetic gamma rays which are suitably collimated through an upwardly and outwardly divergent "window" 11 formed as a cone in radiation shielding means 12. By thus directing the mono-energetic gamma rays into the earth formation 13, the path of the gamma rays leaving source 10 is substantially restricted to that indicated by the space between dotted lines 14. The back-scattered gamma rays are similarly collimated into scintillation crystal 17 by "window" 30 which diverges downwardly and outwardly as a cone formed in shield 12. Extension of this collimation into formation 13 is defined by dotted lines 16. In this manner, there is ultimately defined a critical scattering volume, identified as 15, which is that portion of earth stratum 13 defined by the space intersected by dotted lines 16 and 14. It is the material in this critical scattering volume that determines to a predominant extent the intensity of the gamma rays that are to be measured in the logging process.

As indicated by bore hole 18, most well bores have both irregularly shaped walls, and diameters which vary throughout their lengths. The usual irregularities and variations, have been somewhat exaggerated for the purpose of illustration in the figure, but in some bore holes the defects in shape and diameter may even be greater than those shown in the figure. As shown in the figure, body member 20 is flexibly supported, for example by flexible bellows 21, beneath head 22 which in turn is raised or lowered in the well bore on cable 23. In accordance with the present invention the signal transmitting and receiving portions of body 20 are maintained in contact with the side walls of the bore hole despite the irregularities therein by the provision of a pair of protuberances, identified as 25 and 26, each of which is associated with a signal generating or measuring function. As indicated, protuberance 25 is particularly provided for assuring that the window covering 27, formed over the end of collimation window 11 will remain in wall conforming position when spring means 34 urges body 20 toward wall 18. Thus a more direct path is provided for gamma rays passing from source 10 into the earth formation. At a predetermined distance above protuberance 25, the upper protuberance 26 is associated with collimation opening 30, through which back-scattered gamma rays may enter detecting device 17 with the inclusion of minimum material other than the formation per se. Window covering 32 for collimating means 30 forms a part of the convex contour of protuberance 26.

Protuberances 25 and 26 are suitably urged into engagement with the wall of bore hole 18, as mentioned above, by spring 34 acting upon the opposite, cylindrical side of body 20. As indicated in dotted outline, bow spring 34 is normally retracted against the side of body 20 and held there by latch 36 until the well logging sonde reaches the desired depth, such as the bottom of the well bore. Latch 36 is released, when desired, by any of the means well known in the art, such as that illustrated by solenoid 40. As shown, solenoid 40 is energized from battery 42 when push button 41 is operated.

As explained in the previously-mentioned Jones et al. application, the measured gamma ray energy values are selected to define critical scattering volume 15 by adjusting the pulse height discriminator identified as 44. Discriminator 44 sorts out the electrical pulses generated by photomultiplier 39 and preamplifier 45, each of which corresponds in value to the energy of a gamma ray absorbed in crystal 17.

Discriminator 44 is suitably adjusted to accept only those electrical pulses whose values correspond to a narrow range of gamma ray energies. This range of energies corresponds to the desired range of scattering angles for the mono-energetic gamma rays originating at source 10 and scattered in critical scattering volume 15. The rate of emission of gamma rays from the source is constant, but the rate of detection of gamma rays in the specified energy band is determined not only by the geometry of the device and the setting of the pulse height analyzer but also by the absorption of gamma rays in the formation.

As explained in detail in the aforementioned copending application, this absorption has a direct relationship to the bulk density of the formation through which the gamma rays have travelled. Thus the rate of arrival of these selected electrical pulses, corresponding to gamma rays of the proper energy value, is a measure of the bulk density of that portion of the earth formation traversed by the gamma rays. The counting rate may be indicated by the surface recording means, such as amplifier 50 and oscillograph 51, as the curve 53 on chart 54. As indicated, chart 54 is suitably driven in response to the position of cable 23 through gear reduction 56.

From the foregoing description of the present invention it will be seen that there has been provided a logging sonde capable of investigating the physical characteristics of an earth formation traversed by an irregularly shaped bore hole, wherein the measuring function is performed through a pair of suitably formed protuberances adapted to contact closely the side walls of a well bore throughout the logging run to permit said measurements to be made with the signal transmitting and receiving portions in intimate contact with the bore hole walls, thus reducing to a minimum interference with said measurements by the amount of drilling fluid interposed between the signal generating and receiving positions of the logging sonde. The exact form of the sonde, of the flexible connection between the head and the body of the sonde, of the spring and release mechanism and of the contoured sonde itself can be varied at will. For example, to meet certain practical engineering requirements, the body may have a figure eight or dumbbell-like form. In this way, there is achieved minimum interference of drilling fluid in irregular portions of the bore hole upon the recorded log, without altering the principle of contouring the face of the sonde that contacts the bore hole.

While the preferred embodiment has been described as being particularly useful in the logging of bulk density or porosity by measurement of back-scattered gamma radiation, it will be understood that other logging systems will benefit from the use of contoured logging sondes constructed in accordance with my invention. For example, in radiation-detection systems such as those using neutron-neutron or neutron-gamma ray techniques, it is also desirable to reduce drilling fluid interference to a minimum for the same reasons explained herein.

Many and various modifications and changes in the embodiments of the invention illustrated and described in connection with the drawings will occur to those skilled in the art. All such modifications and changes falling within the scope of the appended claim are intended to be included therein.

I claim:

In a logging sonde for investigating the bulk density of an earth formation traversed by an irregular bore hole and wherein said sonde includes a body portion containing a gamma radiation source, gamma radiation detecting means spaced a predetermined distance from said source, shielding means between said source and detector, collimating means for said radiation source and said detector extending to one side of said body portion, and spring means secured to said body portion for urging said sonde into engagement with the side of said bore hole adjacent to said collimating means, the improvement comprising a first laterally protruding extension of said sonde, said first extension including said collimating means for said source, a second laterally protruding extension of said sonde, said second extension including said collimating means for said detector, and said first and second extensions being spaced along said one side of said body portion in accordance with said predetermined spacing of said source and detector whereby said sonde engages said side of said bore hole at said extensions.

References Cited in the file of this patent

UNITED STATES PATENTS

| | | |
|---|---|---|
| 2,133,776 | Bender | Oct. 18, 1938 |
| 2,302,247 | Neufeld | Nov. 17, 1942 |
| 2,304,910 | Hare | Dec. 15, 1942 |
| 2,334,475 | Claudet | Nov. 16, 1943 |
| 2,346,481 | Garrison | Apr. 11, 1944 |
| 2,443,680 | Herzog | June 22, 1948 |
| 2,469,461 | Russell | May 10, 1949 |
| 2,648,778 | Silverman | Aug. 11, 1953 |
| 2,675,478 | Brunton et al. | Apr. 13, 1954 |
| 2,686,268 | Martin et al. | Aug. 10, 1954 |
| 2,711,482 | Goodman | June 21, 1955 |
| 2,769,914 | Goodman | Nov. 6, 1956 |
| 2,769,918 | Tittle | Nov. 6, 1956 |
| 2,778,950 | Frey et al. | Jan. 22, 1957 |
| 2,778,951 | Tittman | Jan. 22, 1957 |